J. LEWIS.
Banker's Check.
No. 228,087.   Patented May 25, 1880.
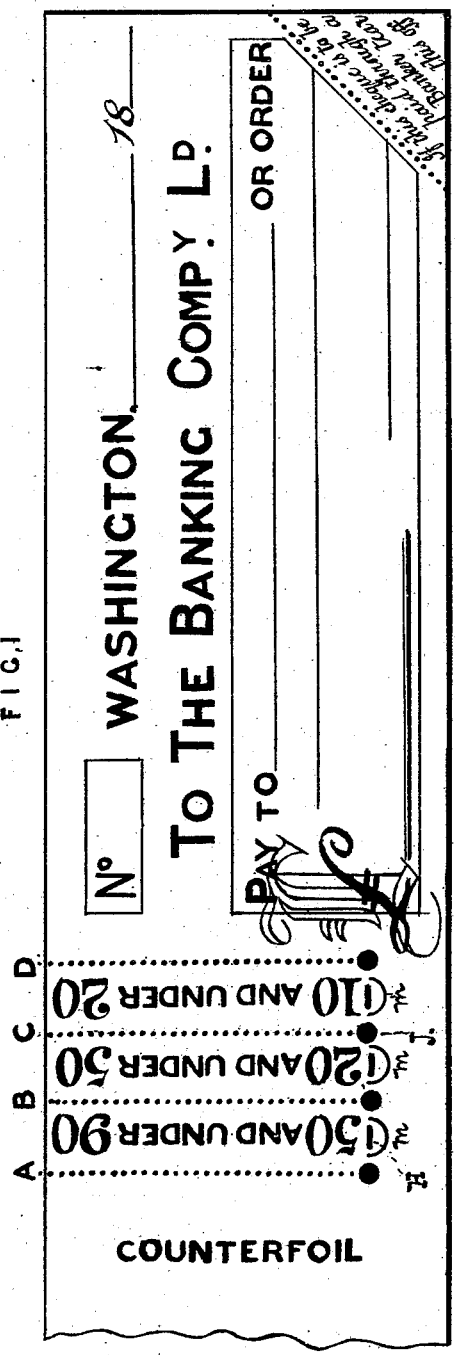
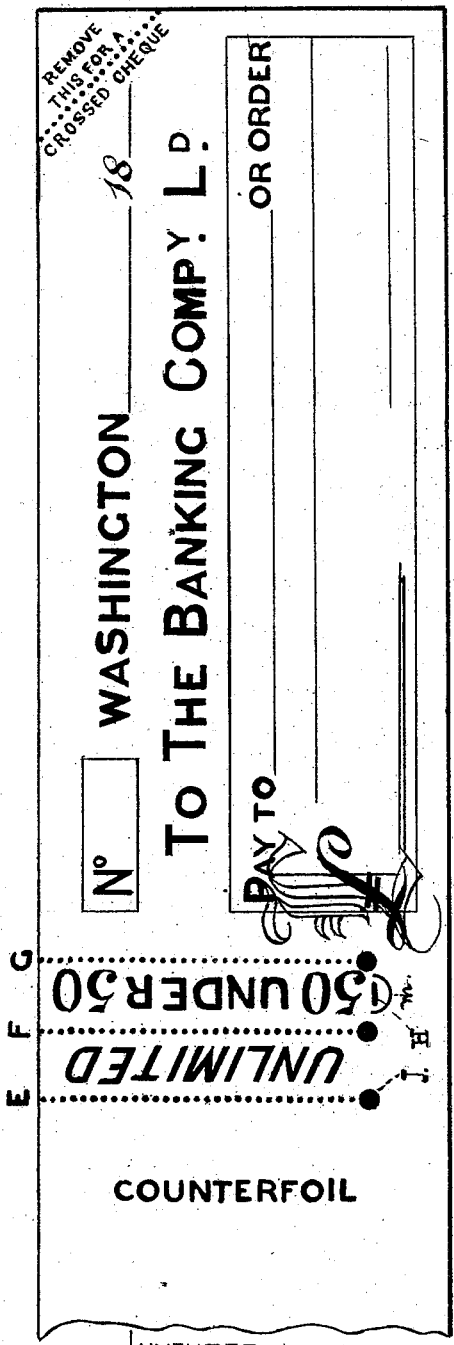
WITNESSES
W. A. Bertram
De L. H. Barclay
INVENTOR
John Lewis.
by L. D. Williams
Attorney.

UNITED STATES PATENT OFFICE.

JOHN LEWIS, OF BIRMINGHAM, ENGLAND.

BANKER'S CHECK.

SPECIFICATION forming part of Letters Patent No. 228,087, dated May 25, 1880.

Application filed January 21, 1880. Patented in England July 17, 1879, in France October 27, 1879, and in Belgium October 29, 1879.

*To all whom it may concern:*

Be it known that I, JOHN LEWIS, of Birmingham, England, have invented certain new and useful Improvements in Bankers' Checks; and I hereby declare the same to be fully, clearly, and exactly described as follows, reference being had to the accompanying drawings, in which are illustrated checks embodying my invention.

My invention is also applicable to other instruments, such as drafts, bills of exchange, &c.

The object of my invention is to prevent or limit the falsifying of any given check, thereby preventing or placing a limit upon the extent of the fraud.

I will describe my invention as applicable to ordinary bankers' checks, thus: At one end of the check, crosswise, I arrange a series of columns divisible by perforations or other suitable means. In each of the said columns I print or perforate the corresponding number to the check, followed by, in the first column, say, "ten pounds and under;" in the second column "ten pounds and under twenty-five pounds," or other equivalent words or figures, increasing in amount in each column, so that upon giving a check for any amount it is simply necessary to separate that portion indicating a larger amount, and to leave remaining that column or columns which limits the amount for which the check is drawn. I also arrange for one corner of the check, most suitable to my requirement, to be perforated, so that it may be readily separated, and upon this corner I print or impress the words "If this cheque is required to be paid through a banker tear this off," or other equivalent words.

In order that my invention may be more clearly comprehended, I append a sheet of drawings, which represent two modifications of my system carried out.

Figure 1 represents a check having four series of limits designated—viz., "ten," "twenty," "fifty," and "ninety." Now suppose the check to be drawn for forty-nine pounds, it would have to be detached at the B line of perforations. For other amounts it could be separated at A, C, or D lines.

Fig. 2 is a more simple modification, having only three vertical columns and three perforations—viz., E, F, and G—the amounts designated being "under 20," "under 50," and "unlimited." If this check were drawn for ten thousand pounds, it would be torn off at the line E, showing the amount to be unlimited; but if the check were filled in for nineteen pounds it would then be torn at the line G, in which case the check could not possibly be increased to more than twenty pounds, the amount of that limit. The lines H are for the purpose of preventing any additions to the figures producing the limits. I also use the curved mark *m* or other device to prevent any extra figures being added. In some cases I also add another column, with the word "unlimited" in the column, and also the word "negotiable;" but in such case I add the words "not negotiable" to the previously-mentioned unlimited column, so that I am enabled to tear out the check for large amounts to be either not negotiable or negotiable, as may be desired.

I usually print the limiting portions of the checks in the manufacture of the paper—*i. e.*, in water-mark—in which case I generally also print the limiting figures in color or ink across the water-marks or other indelible figures or marks, so as to be easily seen by the drawer when the check is being torn out. The payer of the check would be guided by the water-mark or other indelible limit, and not by the printed matter.

For the division-lines I use perforations, which finish in a large hole, J, which I am particular to keep some considerable distance from the bottom of the check or other like instrument—say, at least half an inch of plain space—left for the purpose of easily testing whether a counterfoil has been fastened on. This half-inch plain piece I call the "test part," as any attempt to join on a piece may be immediately detected here, and the terminal point of the line of perforations is indicated by the large hole, rendering it impossible to continue the line of perforations across the check and fraudulently attach a counterfoil.

For the purpose of preventing the removal of the limits altogether I make an indelible old English £ or other mark in the paper under the printed £ or other mark. I also print in any convenient part of the body of the check, in indelible letters, the words "Lewis Patent," or other equivalent words.

The two views will make clear to any person my mode of effectually showing that a check was crossed by the removal of a perforated corner. Thus it will be clearly understood that I establish a series of limits to meet any requirements in conjunction with vertical columns, as well as by my system of showing that a check has been crossed by the aforesaid removal of a corner, which are applicable to bank-checks and other similar instruments, by which I lessen and prevent fraud.

The checks may be manufactured to suit any required amounts or circumstances, and the corner-piece may be used either in conjunction with or separate from the vertical columns.

I claim as my invention—

A banker's check having lines of perforations A B C D, &c., across its counterfoil, terminating short of the edge of the check in larger perforations, as set forth.

In testimony that I claim the foregoing as my own I affix my signature in the presence of two witnesses.

JOHN LEWIS.

Witnesses:
    ARTHUR J. COX,
    ARTHUR PIPER,
Clerks at Mr. J. Lewis's, 1 Temple Row West, Birmingham.